(12) United States Patent
Weh et al.

(10) Patent No.: US 11,760,324 B2
(45) Date of Patent: Sep. 19, 2023

(54) HYDRAULIC BLOCK FOR A HYDRAULIC UNIT FOR A HYDRAULIC VEHICLE BRAKING SYSTEM

(71) Applicant: Robert Bosch GmbH, Stuttgart (DE)

(72) Inventors: Andreas Weh, Sulzberg (DE); Martin Hagspiel, Rettenberg (DE); Matthias Mayr, Ettenberg (DE); Stefan Kaserer, Ofterschwang (DE)

(73) Assignee: ROBERT BOSCH GMBH, Stuttgart (DE)

( * ) Notice: Subject to any disclaimer, the term of this patent is extended or adjusted under 35 U.S.C. 154(b) by 393 days.

(21) Appl. No.: 17/026,890

(22) Filed: Sep. 21, 2020

(65) Prior Publication Data

US 2021/0129816 A1   May 6, 2021

(30) Foreign Application Priority Data

Oct. 31, 2019 (DE) .......................... 102019216833.7

(51) Int. Cl.
| | |
|---|---|
| *B60T 13/12* | (2006.01) |
| *B60T 17/00* | (2006.01) |
| *B60T 7/04* | (2006.01) |
| *B60T 13/66* | (2006.01) |

(52) U.S. Cl.
CPC .............. *B60T 13/12* (2013.01); *B60T 7/042* (2013.01); *B60T 13/66* (2013.01); *B60T 17/00* (2013.01); *B60T 2270/10* (2013.01); *B60T 2270/20* (2013.01); *B60T 2270/30* (2013.01); *B60T 2270/82* (2013.01)

(58) Field of Classification Search
CPC ........ B60T 13/12; B60T 13/66; B60T 13/745; B60T 13/662; B60T 7/042; B60T 8/368; B60T 8/4004; B60T 8/4081; B60T 8/4872; B60T 11/165; B60T 17/00; B60T 2220/04; B60T 2270/10; B60T 2270/20; B60T 2270/30; B60T 2270/82; B60T 13/748

See application file for complete search history.

(56) References Cited

U.S. PATENT DOCUMENTS

| | | | | |
|---|---|---|---|---|
| 3,281,556 | A * | 10/1966 | Salzer | ................ H01H 85/0458 218/90 |
| 4,392,584 | A * | 7/1983 | Bauer | ................ B65D 51/1611 220/373 |
| 2013/0187441 | A1 * | 7/2013 | Schiel | .................. B60T 13/662 303/6.01 |
| 2016/0144836 | A1 * | 5/2016 | Mayr | .................... B60T 11/165 29/401.1 |

(Continued)

FOREIGN PATENT DOCUMENTS

| | | | | |
|---|---|---|---|---|
| DE | 102016014483 | A1 * | 6/2018 | ............. B60T 11/16 |
| WO | 2013023953 | A1 | 2/2013 | |

*Primary Examiner* — Robert A. Siconolfi
*Assistant Examiner* — San M Aung
(74) *Attorney, Agent, or Firm* — NORTON ROSE FULBRIGHT US LLP; Gerard Messina

(57) ABSTRACT

A hydraulic block for a hydraulic unit of a slip-controlled, hydraulic power vehicle braking system including a primary piston, which protrudes from the hydraulic block and at which a pin-shaped signal generator holder for a permanent magnet is situated. The primary piston and the signal generator holder are enclosed with a tubular housing the shape of a cylindrical bowl, at which abut two converging, tangential walls.

7 Claims, 2 Drawing Sheets

(56) References Cited

U.S. PATENT DOCUMENTS

| | | | | |
|---|---|---|---|---|
| 2017/0021813 A1* | 1/2017 | Tandler | ............... | B60T 8/368 |
| 2019/0121385 A1* | 4/2019 | Lee | ............... | B60T 11/18 |
| 2019/0308597 A1* | 10/2019 | Seibert | ............... | B60T 11/20 |

* cited by examiner

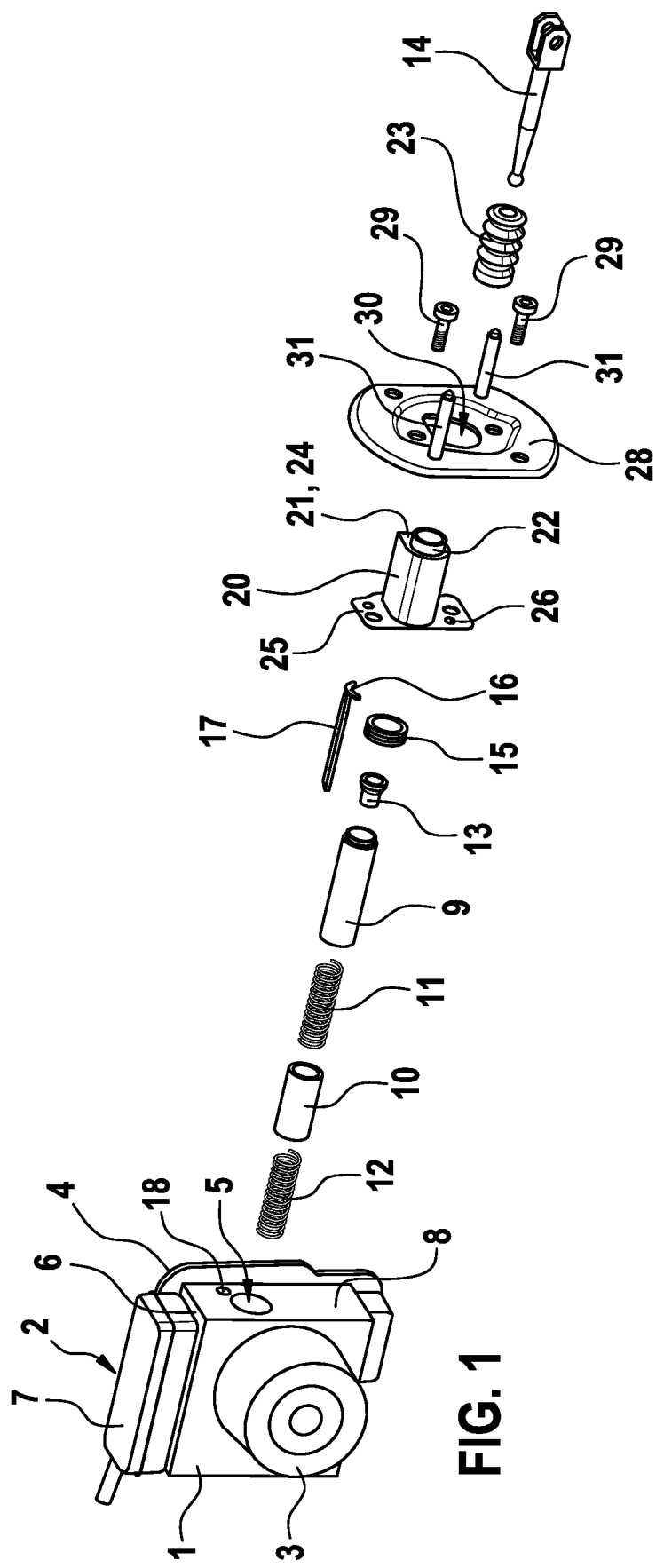
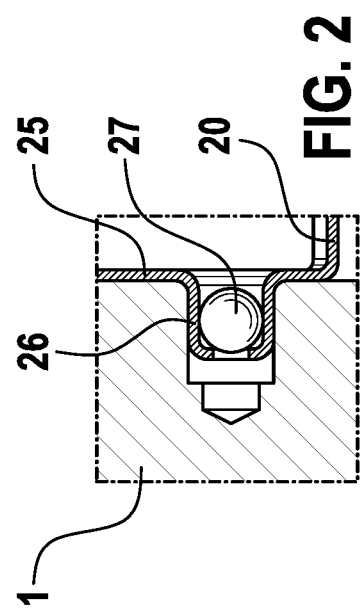

HYDRAULIC BLOCK FOR A HYDRAULIC UNIT FOR A HYDRAULIC VEHICLE BRAKING SYSTEM

CROSS REFERENCE

The present application claims the benefit under 35 U.S.C. § 119 of German Patent Application No. DE 102019216833.7 filed on Oct. 31, 2019, which is expressly incorporated herein by reference in its entirety.

FIELD

The present invention relates to a hydraulic block for a hydraulic unit of a hydraulic vehicle braking system.

BACKGROUND INFORMATION

PCT Application No. WO 2013/023 953 A1 describes a hydraulic unit for a slip-controlled, hydraulic power vehicle braking system. The hydraulic unit includes a hydraulic block, in which a main brake cylinder bore is situated, in which a main brake cylinder piston is displaceably accommodated. The main brake cylinder piston may be displaced via a pedal rod, which is connected to the main brake cylinder piston and to a foot brake pedal in an articulated manner, for the purpose of generating a brake pressure in the main brake cylinder bore.

SUMMARY

A hydraulic block according to the present invention is provided for a hydraulic unit of a hydraulic vehicle braking system, in particular for a hydraulic power vehicle braking system and/or a slip-controlled vehicle braking system. Slip controls are in particular anti-lock systems, traction control systems and/or electronic stability control systems/electronic stability programs, for which the abbreviations ABS, TCS, ESC and ESP are commonly used. The latter are colloquially also referred to as "anti-slip controls." Slip controls are conventional and will not be explained here in greater detail.

The hydraulic block is used to mechanically fasten and hydraulically interconnect hydraulic components of the vehicle braking system or of its brake pressure control and/or slip control. Such hydraulic components are, among other things, solenoid valves, check valves, hydraulic accumulators, damping chambers and pressure sensors. In the case of a power vehicle braking system, the hydraulic block includes a power brake pressure generator, the power brake pressure generator usually including a piston cylinder unit situated in a power cylinder bore of the hydraulic block. To generate brake pressure, the piston is displaced in the power cylinder bore via a screw drive with the aid of an electric motor. The electric motor is situated at the outside of the hydraulic block.

In the hydraulic block, the hydraulic components are fastened in receptacles, which are designed in most cases as cylindrical through holes or blind holes, some of them being diameter-staggered. "Interconnection" means that the receptacles or the hydraulic components fastened therein are connected through lines in the hydraulic block according to a hydraulic circuit diagram of the vehicle braking system or its slip control. The lines are typically drilled in the hydraulic block.

Equipped with the hydraulic components of the vehicle braking system or its slip control, the hydraulic block forms a hydraulic unit, "equipped" meaning that the hydraulic components are each fastened in the receptacles of the hydraulic block provided for them.

Hydraulic wheel brakes of the vehicle braking system are connected to the hydraulic block via brake lines.

In accordance with an example embodiment of the present invention, the hydraulic block includes a main brake cylinder bore, in which a main brake cylinder piston is displaceably accommodated. The main brake cylinder bore is open on one side of the hydraulic block, which is referred to here as the first side. The main brake cylinder bore has an orifice on the first side of the hydraulic block, from which the main brake cylinder piston protrudes. The main brake cylinder piston may be displaceably guided directly in the main brake cylinder bore or, for example, in a cylinder bushing situated in the main brake cylinder bore.

To protect the main brake cylinder piston against dirt and moisture, the hydraulic block according to the present invention includes a hollow, in particular tubular, housing that encloses a portion of the main brake cylinder piston protruding from the hydraulic block. The housing is situated at the outside of the hydraulic block on the first side, covers the orifice of the main brake cylinder bore and is open in the area of the orifice of the main brake cylinder bore, so that the main brake cylinder piston is capable of protruding from the main brake cylinder bore into the housing it is enclosed by.

At a distance from the hydraulic block, so that the main brake cylinder piston may be displaced into the main brake cylinder bore to generate a brake pressure, a signal generator holder, which extends laterally next to the main brake cylinder piston into a signal bore that runs in parallel to the main brake cylinder bore, may be fastened at the portion of the main brake cylinder piston that protrudes from the hydraulic block. Inside the signal generator bore, the signal generator holder has a signal generator, for example a permanent magnet, whose signal is measurable by a sensor situated in the proximity of the signal generator bore in the hydraulic block or in the signal generator bore. The signal generator is used to establish a position or a movement of the main brake cylinder piston.

According to the example embodiment of the present invention, the housing also encloses a portion of the signal generator holder that is located outside of the signal generator bore of the hydraulic block and that is located laterally adjacently to the main brake cylinder piston. In this way, the signal generator holder is also protected against dirt and moisture.

Refinements and advantageous embodiments of the present invention are described herein.

All features provided in the description herein and in the figures, may be implemented individually or, in general, in any combination with each other in the specific embodiments of the present invention. Embodiments of the present invention that do not include all, but only one or multiple feature(s) of one claim or of one specific embodiment of the present invention, are possible in general.

BRIEF DESCRIPTION OF THE DRAWINGS

The present invention is explained in greater detail below on the basis of one specific embodiment shown in the figures.

FIG. 1 shows a perspective exploded view of a hydraulic block according to an example embodiment of the present invention.

FIG. 2 shows one detail of the hydraulic block from FIG. 1.

DETAILED DESCRIPTION OF EXAMPLE EMBODIMENTS

Figure 3:
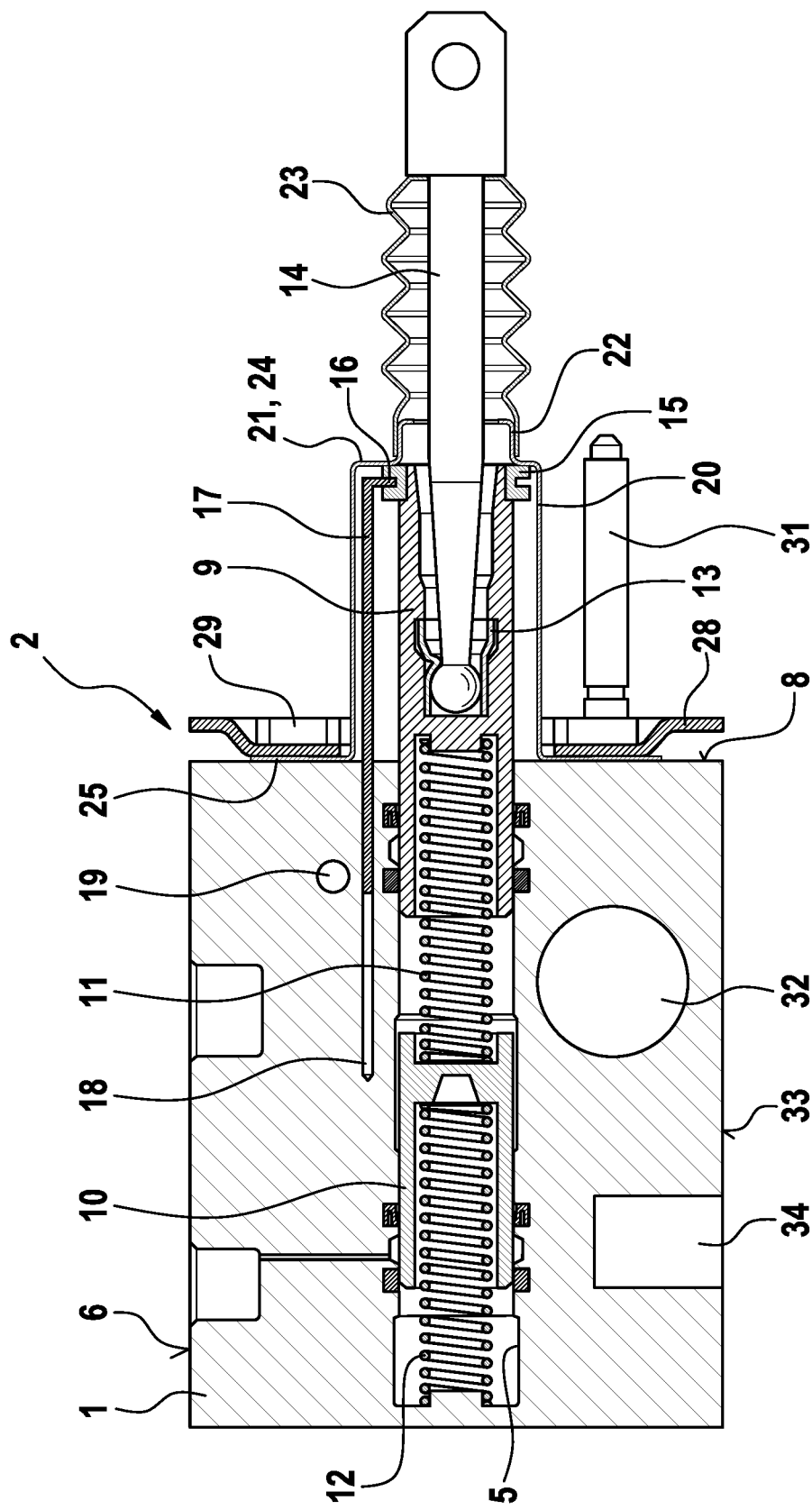
FIG. 3 shows a sectional illustration of the hydraulic block from FIG. 1.

Hydraulic block 1 according to an example embodiment of the present invention illustrated in FIGS. 1 and 3 is provided for a hydraulic unit 2 of a hydraulic power vehicle braking system having a slip control. Such slip controls are, for example, anti-lock systems, traction control systems and/or electronic stability control systems/electronic stability programs, for which the abbreviations ABS, TCS, ESC and ESP are commonly used. Slip controls are known per se and will not be explained here.

In the exemplary embodiment, hydraulic block 1 is a narrow, cuboidal metal block, whose opposite sides are almost square-shaped. "Narrow" means that a distance between the two large sides is not greater than half a length or width of the large sides. In the exemplary embodiment, the distance between the two large sides is approximately a quarter to a third of the length or width of the large sides. Other side ratios are possible.

Hydraulic block 1 is used to mechanically fasten and hydraulically interconnect hydraulic components of the slip control including a brake pressure control of the power vehicle braking system. Such hydraulic components are, among other things, solenoid valves, check valves, hydraulic accumulators, damping chambers and pressure sensors, which are fastened in receptacles in the hydraulic block. The receptacles are cylindrical recesses, blind holes and/or also through holes, which may have diameter steps and in which the hydraulic components are or may be inserted and fastened in a pressure-tight manner through circumferential caulking, for example. The hydraulic components may be counter-sunk in the receptacles or protrude from hydraulic block 1. Equipped with the hydraulic components, an electric motor 3 of a power brake pressure generator, and an electronic control unit 4, hydraulic block 1 forms hydraulic unit 2 for brake pressure control and slip control of the power vehicle braking system.

Hydraulic interconnection means that the receptacles for the hydraulic components are connected to one another through lines that lead through hydraulic block 1 according to a hydraulic circuit diagram of the power vehicle braking system or its slip control. The receptacles and lines form a so-called "bore" of hydraulic block 1, it also generally being possible to provide the receptacles and lines in a different way than drilling. Hydraulic block 1 according to the present invention is irregular drilled in a Cartesian manner, which means that the receptacles for the hydraulic components and the lines connecting same run in parallel and perpendicularly to one another and to the sides and edges of cuboidal hydraulic block 1.

Hydraulic block 1 has a main brake cylinder bore 5 that is situated in parallel to an upper transverse side 6 and the two large sides in hydraulic block 1. Upper transverse side 6 is referred to in such a way, because it is located on top in an intended standard position. A brake fluid reservoir 7 is put on top of it.

Main brake cylinder bore 5 is open on a first side 8 of hydraulic block 1 and closed or locked at an opposite end. First side 8 abuts upper transverse side 6 and the two large sides of hydraulic block 1.

A primary piston 9, which may be also referred to as a rod piston, and a secondary piston 10, which may also be referred to as a floating piston, are displaceably accommodated in main brake cylinder bore 5. Primary piston 9 and secondary piston 10 may also be understood as main brake cylinder pistons 9, 10. In the exemplary embodiment, the latter are hollow pistons, which is not mandatory for the present invention, however. A first piston spring 11 is situated between the two main brake cylinder pistons 9, 10. Secondary piston 10 is supported by a second piston spring 12 at a closed end of main brake cylinder bore 5.

A pedal rod 14, which protrudes from primary piston 9, is fastened in an articulated manner in primary piston 9 with the aid of a fastening clip 13. With the aid of a (foot) brake pedal (not shown in the drawing) or a (hand) brake lever (not shown in the drawing), which is connectable to pedal rod 14 in an articulated manner, primary piston 9 may be displaced in main brake cylinder bore 5 and a hydraulic brake pressure may be generated as a result thereof to actuate the vehicle braking system. The brake pressure in main brake cylinder bore 5 between the two main brake cylinder pistons 9, 10 displaces secondary piston 10.

Primary piston 9 protrudes from main brake cylinder bore 5 and from hydraulic block 1 on first side 8. At an end of primary piston 9, which protrudes from hydraulic block 1, a driving ring 15 is fixedly situated having a circumferential groove in its outer periphery, in which a complementary claw 16 engages that sticks out radially from a pin-shaped signal generator holder 17, so that signal generator holder 17 moves together with primary piston 9. Signal generator holder 17 has a permanent magnet as the signal generator, which is located inside signal generator holder 17 and is thus not visible, at its remote end from claw 16. Signal generator holder 17 is fastened at a distance from hydraulic block 1 at primary piston 9, which is a main brake cylinder piston, via its claw 16 and driving ring 15, which is fixedly situated at primary piston 9.

Signal generator holder 17 is located in parallel to primary piston 9 next to primary piston 9 and extends into a signal generator bore 18, which is situated in parallel to main brake cylinder bore 5 in hydraulic block 1. Signal generator holder 17 is located partially outside of hydraulic block 1, as is primary piston 9. Signal generator holder 17 and signal generator bore 18 are drawn in FIG. 3 in such a way that they are rotated about main brake cylinder bore 5 into the section plane for the sake of visibility. In the specific embodiment of the present invention, signal generator holder 17 and signal generator bore 18 are in fact behind the section plane, which is an axial plane of main brake cylinder bore 5, in parallel to the two large sides of hydraulic block 1.

A hole for accommodating a magnet sensor 19, with the aid of which a position of the permanent magnet representing the signal generator is establishable, is present in hydraulic block 1 transversely to signal generator bore 18 and to main brake cylinder bore 5.

On first side 8 of hydraulic block 1, i.e., on the side on which primary piston 9 and signal generator holder 17 moving together with primary piston 9 protrude from hydraulic block 1, a housing 20 is situated that is open on first side 8 of hydraulic block 1 and that covers an orifice of main brake cylinder bore 5, and that encloses primary piston 9 protruding from main brake cylinder bore 5 and from hydraulic block 1 and signal generator holder 17 also protruding from hydraulic block 1.

Housing 20 is tubular and has a peripheral wall, which has the shape of a cylindrical bowl, extends over more than 180° and less than 270° in the peripheral direction, and which is tangentially abutted by two planar peripheral wall sections running obliquely toward one another and being connected to a peripheral wall section, which also has the shape of a cylindrical bowl, resulting in a tubular shape that is closed in the peripheral direction and that encloses primary piston 9 and signal generator holder 17 both protruding from hydraulic block 1. At a remote end from hydraulic block 1, housing 20 includes a front wall 21 having a hole, which is coaxial to main brake cylinder bore 5, for pedal rod 14 to pass through. The hole has a collar 22, which has the shape of a cylindrical tube at which a bellows 23 is fastened, which closes off at pedal rod 14. Housing 20 having bellows 23 protects primary piston 9, signal generator holder 17, and main brake cylinder bore 5 against moisture and dirt.

The shape of housing 20 is not mandatory for the present invention; a shape is to be selected that tightly encloses primary piston 9 and signal generator holder 17.

Front wall 21 of housing 20 forms a stop 24 for primary piston 9 that delimits a displacement of primary piston 9 out of main brake cylinder bore 5 and out of hydraulic block 1. Stop 24 establishes an initial position of primary piston 9, into which piston springs 11, 12 move primary piston 9, when no force is exerted on pedal rod 14.

Housing 20 includes a fastening flange 25 at its open end, which is opposite to front wall 21 and with the aid of which it is fastened on first side 8 of hydraulic block 1. Fastening flange 25 includes two hollow pins 26 that are opposite one another and that protrude into the blind holes in first side 8 of hydraulic block 1 and are held there by clamping. The clamping force is increased with the aid of balls that are pressed into hollow pins 26 and expand hollow pins 26, so that hollow pins 26 are reliably kept in the blind holes of hydraulic block 1 and housing 20 is reliably kept on hydraulic block 1. The balls form expansion elements 27 that ensure that housing 20 does not move with respect to hydraulic block 1. One of the two hollow pins 26 is seen in FIG. 4 having a ball pressed into it in the form of an expansion element 27.

Housing 20 including its fastening flange 25 is a deep-drawn part made of sheet metal, whereby fastening flange 25 is thin, thus allowing for hydraulic block 1 or hydraulic unit 2 equipped with the hydraulic components of the brake pressure control and of the slip control being fastened in the proximity of a splashboard of a motor vehicle, for example.

After fastening housing 20 on first side 8 of hydraulic block 1, a perforated plate 28 is put on top of fastening flange 25 and fastened on hydraulic block 1 using screws 29. Perforated plate 28 has a hole 30 for housing 20 to pass through, which has the cross section of housing 20. Studs 31 stick out from perforated plate 28 for the purpose of fastening to the splashboard of the motor vehicle.

For a power actuation of the vehicle braking system, hydraulic block 1 includes a power cylinder bore 32, in which a piston (not illustrated), which may also be referred to as a plunger piston, is displaceable with the aid of electric motor 3 via a planetary gear set (not visible in the drawing) and a screw drive. In the illustrated specific embodiment of the present invention, power cylinder bore 32 goes perpendicularly through the two large sides of hydraulic block 1. Main brake cylinder bore 5 is located between power cylinder bore 32 and upper transverse side 6 of the hydraulic block.

In a lower transverse side 33 that is opposite upper transverse side 6, a blind hole is situated in hydraulic block 1 as a simulator cylinder 34, in which a simulator piston, which is not visible in the drawing and on which spring pressure is applied, is axially displaceably accommodated.

Electronic control unit 4 is situated opposite electric motor 3 on one of the two large sides of hydraulic block 1.

What is claimed is:

1. A hydraulic block for a hydraulic unit for a hydraulic vehicle braking system, the hydraulic block comprising:
    a main brake cylinder bore which is open at a first side of the hydraulic block and in which a main brake cylinder piston is displaceably accommodated, wherein the main brake cylinder piston protrudes from the hydraulic block at the first side of the hydraulic block;
    a housing that covers an orifice of the main brake cylinder bore that is open in an area of the orifice of the main brake cylinder bore and that encloses a portion of the main brake cylinder piston protruding from the hydraulic block; and
    at a distance from the hydraulic block, a signal generator holder, which extends next to the main brake cylinder piston into a signal generator bore that runs in parallel to the main brake cylinder bore in the hydraulic block, wherein the signal generator holder is fastened to the portion of the main brake cylinder piston protruding from the hydraulic block,
    wherein the signal generator holder has a signal generator inside the signal generator bore and wherein the signal generator holder is enclosed by the housing outside of the hydraulic block;
    wherein the housing has a hollow pin, which protrudes into a hole in the hydraulic block and aligns the housing at the hydraulic block,
    wherein an expansion element is pressed into the hollow pin, which expands the hollow pin and is clamped in the hole in the hydraulic block.

2. The hydraulic block as recited in claim 1, wherein the housing has a stop for the main brake cylinder piston delimiting a protrusion of the main brake cylinder piston from the hydraulic block.

3. The hydraulic block as recited in claim 1, wherein the housing is tubular.

4. The hydraulic block as recited in claim 1, wherein a peripheral wall of the housing has a shape of a cylindrical bowl section or a truncated cone sleeve section extending in a peripheral direction over more than 180° and whose longitudinal edges tangentially abut two peripheral wall sections that converge at increasing distance from the cylindrical bowl section or the truncated cone sleeve section and that are connected at one apex, resulting in a peripherally closed tubular shape.

5. The hydraulic block as recited in claim 1, wherein the housing is a deep-drawn part.

6. The hydraulic block as recited in claim 1, wherein the hydraulic block has two hollow pins that are situated around the orifice of the main brake cylinder bore.

7. The hydraulic block as recited in claim 1, wherein the housing includes a front wall having a hole which is coaxial to the main brake cylinder bore, wherein the hole has a cylindrical tubed shaped collar configured to fasten to a bellows.

\* \* \* \* \*